April 17, 1928.
C. M. WATROUS
WHEEL FOR TOYS
Filed May 8, 1924
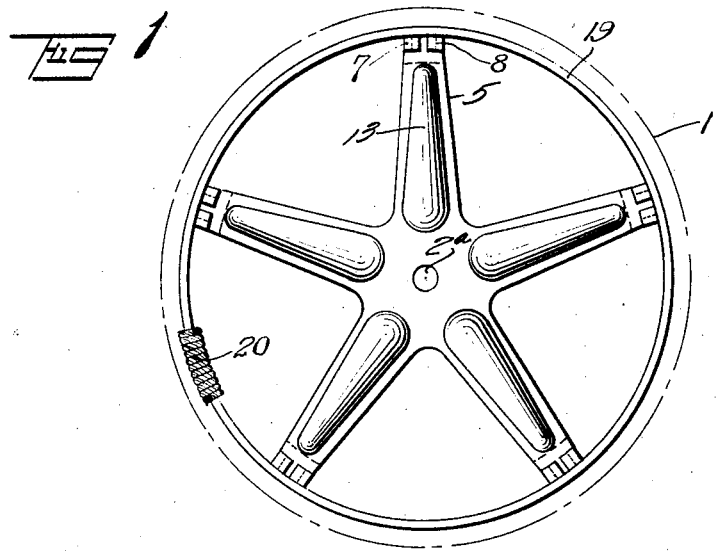
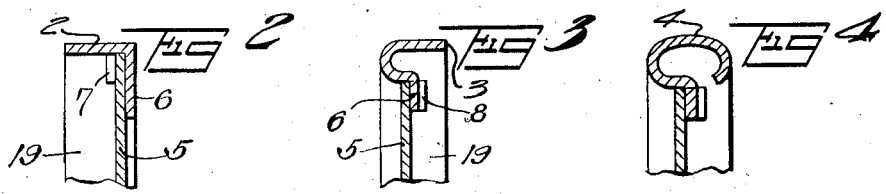
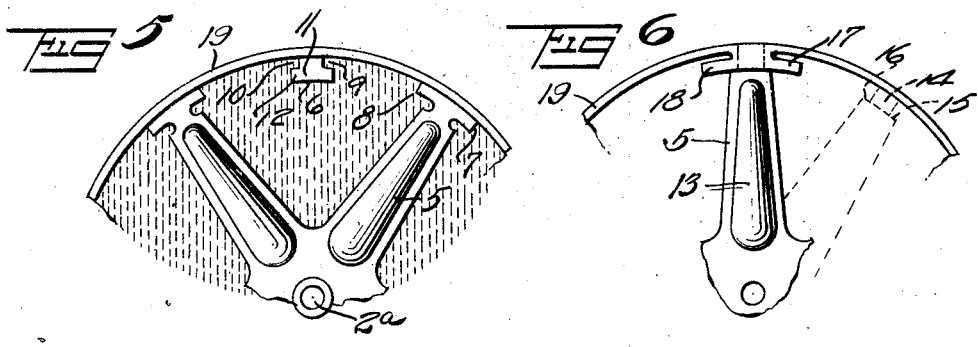
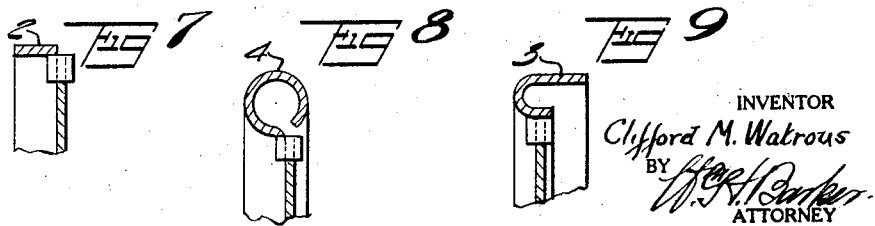
INVENTOR
Clifford M. Watrous
BY
ATTORNEY Patented Apr. 17, 1928.

1,666,611

UNITED STATES PATENT OFFICE.

CLIFFORD M. WATROUS, OF EAST HAMPTON, CONNECTICUT, ASSIGNOR TO GONG BELL MANUFACTURING COMPANY, OF EAST HAMPTON, CONNECTICUT, A CORPORATION OF CONNECTICUT.

WHEEL FOR TOYS.

Application filed May 8, 1924. Serial No. 711,824.

The invention relates to wheels and particularly to those employed on toys of various types, which to the trade are known as rolling toys.

It relates more particularly to a wheel which may be produced upon a very economical basis and with a minimum of scrap loss in the material from which it is formed. Such wheels are used on toys in simulation of the standard types of wheels used on vehicles such as bicycles, motor vehicles and machines, where it is desirable to have a comparatively large tread portion for the tire of the wheel.

The main object of this invention is to provide an extremely inexpensive type of wheel for toys, which will have the effect and appearance of the types of wheels used on ordinary vehicles and particularly those having the enlarged resilient tires so commonly used on trucks, pleasure cars, motors, bicycles and the like.

A further and more interesting object is to produce a toy wheel with a minimum scrap loss of the material and one which will have unusual strength and durability.

In toy manufacture, one of the most expensive items of wheel toys of high grade, is the production of a wheel which will run evenly and smoothly. For instance, cast wheels and in fact, formed wheels, must usually be "trued" up to provide for a smooth even running of the toy.

This invention contemplates the production of a wheel that will have all the desirable advantages, will be true in its running and particularly attractive in its appearance, all at a minimum cost of material and labor.

The entire wheel is formed up on dies from stampings so that it may be manufactured in quantity with absolute uniformity and precision, both as to the running tread, disposition of spokes and embossing for stiffening the elements.

The wheel herein disclosed is centered and its peripheral tread surface, or tire section, is formed up by blanking, drawing and upsetting a sheet of metal, thus providing uniformity, accurate centering and smooth peripheral edges or treads.

This invention produces a wheel of unusual finish and appearance and in contra distinction to the cast type of wheel.

The latter has been commonly employed and of necessity must be "tumbled" to smooth it up, and its peripheral surfaces must be ground to secure a smooth tread or running surface. It must be centered and machined for the axle opening, and on the whole, requires a number of operations. At best, it is a casting, somewhat difficult to make in small sizes and subject to fracture, as it is of cast iron.

The wheel described herein may be made from a very tough material, ductile enough to be punched, curled and deformed to provide any desired effects.

The wheels described herein, and illustrated herein, are somewhat similar to those disclosed in my prior applications, Serial Nos. 664,417, filed September 24, 1923, and 566,901, filed June 8, 1922, which applications have since matured respectively into Patents 1,495,140 and 1,497,659, dated May 20, 1924 and June 10, 1924, although the present application has features of improvement not illustrated or disclosed or claimed in the prior cases.

Referring to the drawings:

Figure 1, illustrates a wheel in side elevation embodying the invention.

Figure 2, is a sectional view on an enlarged scale through one of the spoke sections.

Figure 3 is a similar view showing a slightly different degree of curvature for the tire section, taken in sections similar to Figure 2.

Figure 4, is a similar view in section illustrating a more rounded tire section.

Figure 5, is a view of the blank illustrating the manner of blanking out the spokes, hub and attached elements.

Figure 6, illustrates a slightly modified or reversed form of attaching means between the spokes and rim sections.

Figures 7, 8 and 9 show tire portions similar to those of Figures 2, 3 and 4, as applied to the modified form of spoke of Figure 6.

It will be readily apparent that the wheels herein described are made from blanked out and formed up sheet metal. This is first blanked out to a disk form, somewhat larger than the finished diameter of the wheel. In blanking out the disk, it is centrally perforated to provide an axle opening and the metal during this blanking operation may be drawn out about the perforation to form a type of hub.

Sheet metal is first blanked and pierced into a disk 1, by which operation the periphery is accurately formed and the disk centered as at 2ª, the metal, about the perforation, being drawn out to any desired degree to provide a hub for the wheel.

The outer edge of the disk 1, is upset or curled as at 2, 3, 4, illustrated in Figs. 2 to 4 inclusive and Figs. 7 to 9 inclusive. This upsetting and curling of the outer edge of the disk provides for treads of various proportions and shapes, there being either a slight extension as at Figure 2, or an extended tread as at 3, in Fig. 3, or a still further curled and rounded tread as illustrated at 4, in Figure 4.

Obviously, the curling or upsetting of the edge of the disk may take many forms to suit any particular requirements.

If the tire or tread section is to be wound, with a resilient material, as represented at 20, Fig. 1, as is often done for indoor toys, a great saving can be accomplished by utilizing the short offset of Fig. 2 or the comparatively short offset of Fig. 3. These, when wound with a chenille or other material of resilient character, will provide, in appearance, an enlarged tire similar to those of the pneumatic type.

In using these shorter offsets of Figs. 2 and 3, for the rim, a less quantity of winding material is required, thus effecting an economy as compared with the amount necessary when the form of tread assumes that of Fig. 4. In fact, the type of rim of Fig. 4, approaches the now known "balloon" type of tire in appearance.

When the sheet metal has been blanked out, to the form of disc 1, piercing dies are employed for stamping out of the body of the material, the spoke and hub section of the wheel including the spoke elements 5, and the tread or rim section 19 including the attaching elements 6. This is well illustrated in Fig. 5, where the shaded portion of the drawing represents the material stamped out of the interior body portion of the disc, leaving the central wheel section having the spokes 5, the outer ends of which have clamping ears 7, 8.

There is also left an annular tread or rim section 19 from which extends the inwardly projecting attachment element 6 constituting short interiorly-extending flanges, which are cut in as at 9, 10, leaving an intermediate neck 11, about which the ears 7, 8, may be clamped. The lower portion 12, extends downwardly a sufficient distance to give a support against the flat portion of the spoke.

It will be obvious that the entire central portion of the disc is left intact, except for the piercing 2ª, at the drawn out hub, and that the several spokes of the wheel are punched out of the material of the disc. By leaving the attaching elements 6, during the punching operation, a means of connection is provided for the ends of the spokes with the rim or felloe section of the wheel.

After the spoke and hub section and the tread or rim section are stamped out, the spoke elements are brought into radial line with the attaching elements 6, and with a suitable die, the ears 7, 8, are folded about substantially filling the cut away portions 9, 10. This construction gives an extremely rigid connection between the rim portion and the spoke and hub elements.

If desired, a comparatively very thin sheet metal may be employed and this may be stiffened by embossing the spokes with any appropriate design, with suitable dies, which will deform the metal as illustrated at 13, Fig. 1. It will also be quite obvious that the offsetting, curling or rolling up of the peripheral edge will provide a very stiff rim for the wheel.

With the form of wheel described, the spokes are blanked out from what would ordinarily be scrap and, therefore, there is considerable economy in reducing the scrap to a minimum, during the blanking operation, by forming the spokes at one portion of the disc, and the attaching means for the spokes, as a dependent element, from the rim.

In Figs. 6 to 9, inclusive, there is illustrated a similar construction in which the spoke sections are stamped out with the reduced end 14, providing shoulders 15, 16, and the interior portion of the rim is stamped to provide ears 17, 18.

The ears 17, 18, are folded about the reduced end 14, of the spoke, and against the shoulders 15, 16, thus giving what is in effect, a reversal of the attaching elements illustrated in Figs. 1 and 5. In this case, as in the case of Figs. 1 and 5, the spokes are blanked out from what is ordinarily scrap.

The rim section is blanked out of a disc and the spoke and hub section is also blanked out of sheet metal.

The rim, tire or felloe portion of the wheel being stamped up to an annular like form, is unusually stiff and strong and by deforming the metal in embossing dies, the spokes may be similarly stiffened up. The entire structure being made from dies, has a smooth peripheral tread, no matter what the particular type of annular like curling or offsetting at the edge of the disc.

For outdoor toys, the rims may be made of any desired form, and will run true and smooth, and will not be subject to the same liability of breaking as the rims of cast wheels.

If it is desired to increase the effect and appearance of a pneumatic or other resilient tire, these rims may be covered in any suitable manner, one of the preferred forms being to wind them with a chenille tape or cord which, of course, increases the diameter of the tire portion and more closely simulates the familiar type of pneumatic tires.

These rim sections, if smooth, have little tendency to cut through the covering in use and of course, for wheeled toys to be used in the house, there is an advantage in having the rims covered. The covering reduces noise, and obviates the possibility of scratching polished floors, to say nothing of protecting the child from abrasions although the tires, if formed in dies, may be curled and rolled so that there are no sharp sprues or protuberances to scratch or cut the child.

The wheels herein described may be produced in quantity and with accuracy, giving unusually attractive effects and at a very nominal cost.

Due to the embossing and curling of the metal, a comparatively thin sheet metal may be employed and when assembled, will give a structure of unusual strength. No finishing, machining or centering is required in the operations, as the dies may be so formed as to produce the complete wheel from sheet metal. Furthermore, there is an advantage in the ease of assembling on the cart or other toy where they may be used, due to the fact that they are all of uniform character as they come from dies.

What I claim as my invention and desire to secure as Letters Patent is:

1. A wheel having a central section with spokes and a separate annular tire section, with means at the center of the finished wheel for attachment to an axle and inter-engaging means between the ends of the spokes and the annular tire section for securely uniting such sections, both of said sections being stamped from a single disk.

2. A wheel for toys having spokes and attaching means therefor, stamped from a disk, a tire portion having an annular like tread stamped from a disk and attaching means extending from the tire portion and co-operatively engaged and secured to the attaching means of the spokes.

3. A stamped out wheel for toys having its spokes and tire separate from each other and each formed from a disk of material, the spokes and tire having respectively, elements for interengagement one with the other for locking the tire and spokes together to form the finished wheel.

4. A stamped out wheel for toys having a central hub section with spokes provided at their outer ends with extended ears, an annular tire portion having dependent elements engaged by the ears of the spokes, said spokes, ears and dependent tire portions stamped from a single disk and the central hub and annular tire sections being securely united together by means of the aforesaid ears and dependent elements.

5. A wheel for toys having spokes, a tire portion, and interengaging elements intermediate the spokes and tire elements, all stamped from a single sheet of material.

6. A wheel for toys consisting of a felloe and tread portion and a spoke portion all stamped from a blanked-out disk, said sections being reunited at points other than those from which they were blanked.

7. A wheel for toys consisting of a felloe section having a deformed peripheral edge providing a smooth running section or tread and having interiorly thereof a flange, and a spider-like spoke section blanked out of the disk and reunited to the flange.

8. A wheel for toys consisting of a felloe section having a deformed peripheral edge providing a smooth running tread member and a blanked-out spider-like spoke section separate from the felloe section, and united, as to the ends of the spokes, with the tread of the felloe section, the said united parts overlapping each other.

CLIFFORD M. WATROUS.